K. RUSHTON & E. M. SHANNON.
REAR SWING TRUCK FOR LOCOMOTIVES.
APPLICATION FILED FEB. 17, 1913.
1,060,499.
Patented Apr. 29, 1913.
2 SHEETS—SHEET 2.
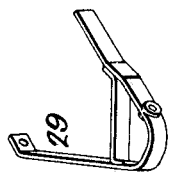
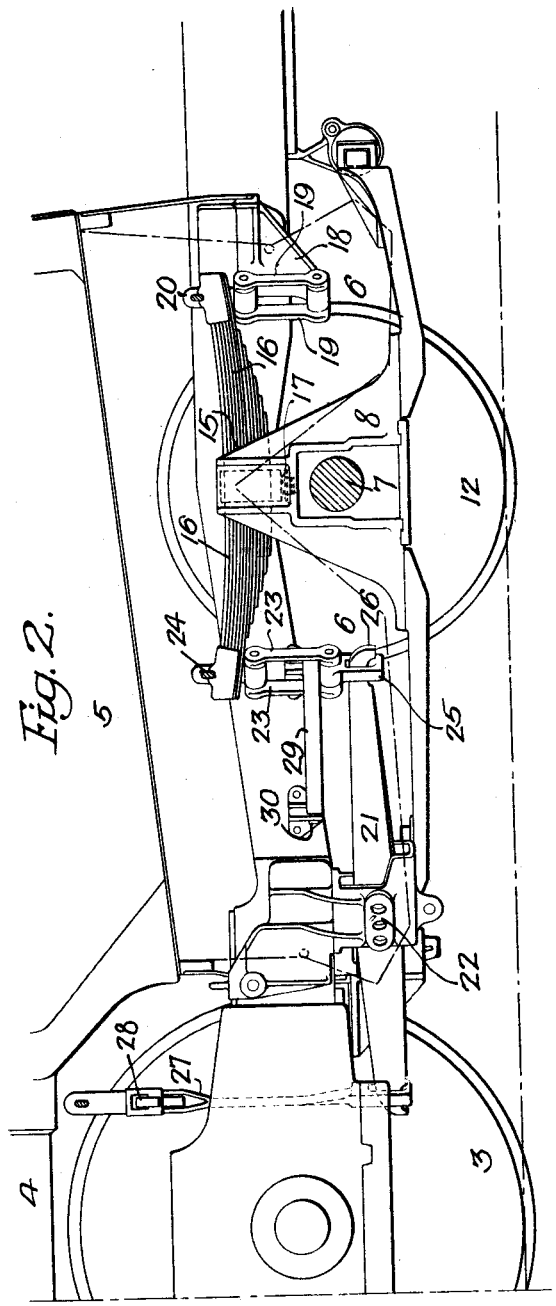
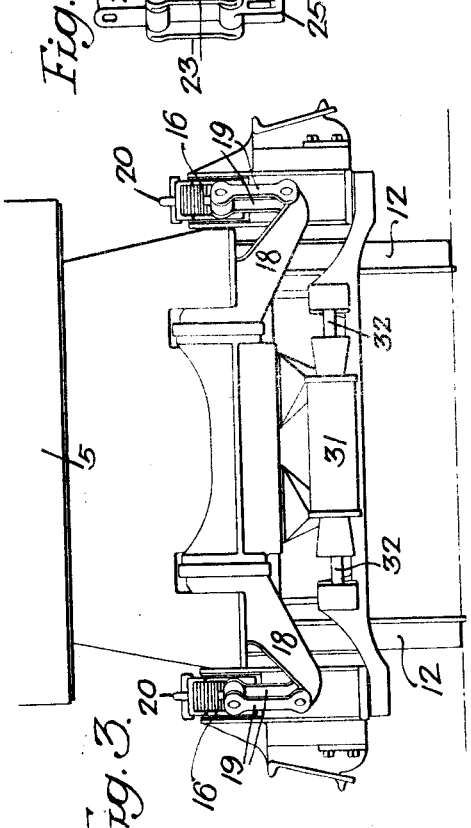
Inventors.-
Kenneth Rushton.
Ellwood M. Shannon
by their Attorneys.

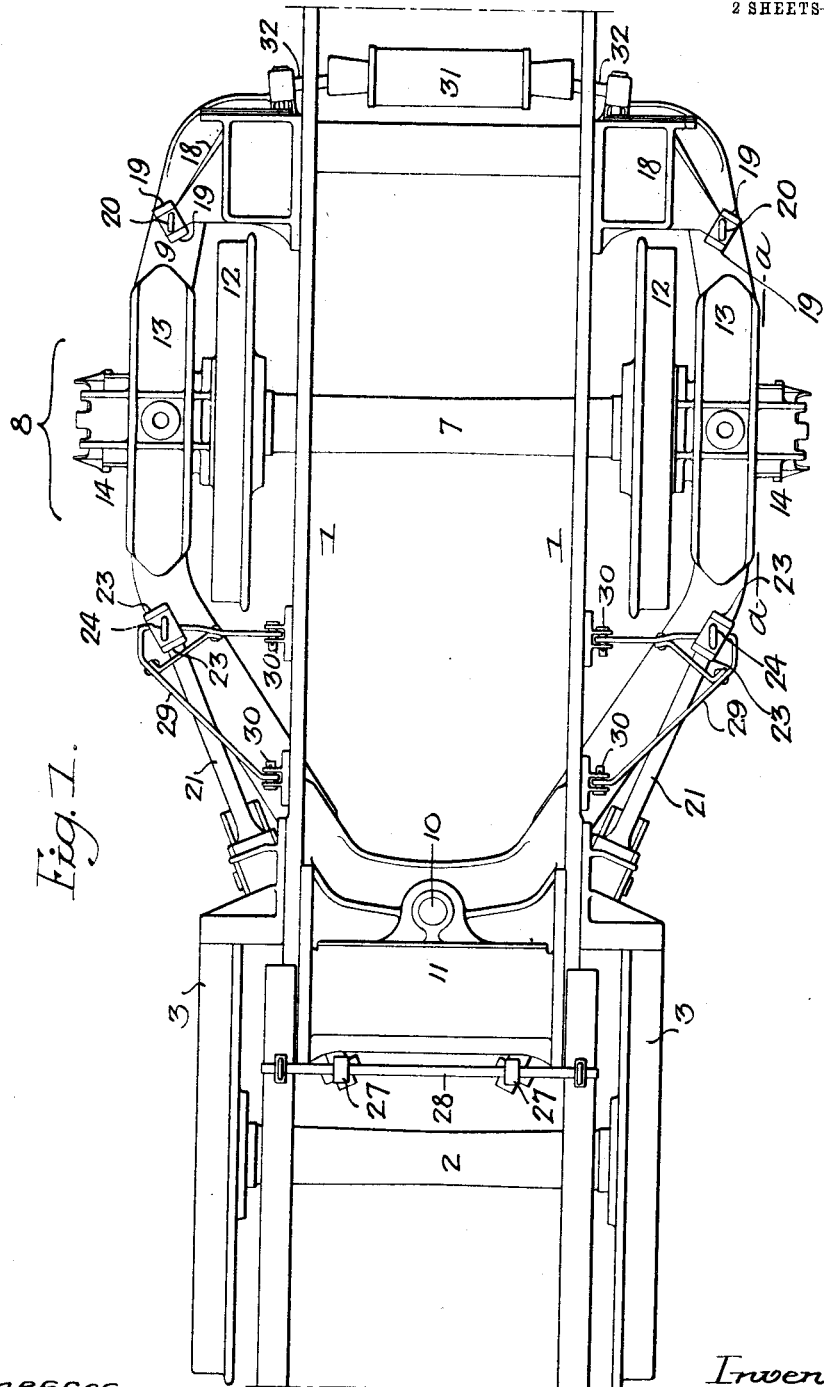

UNITED STATES PATENT OFFICE.

KENNETH RUSHTON AND ELLWOOD M. SHANNON, OF PHILADELPHIA, PENNSYLVANIA, ASSIGNORS TO THE BALDWIN LOCOMOTIVE WORKS, OF PHILADELPHIA, PENNSYLVANIA, A CORPORATION OF PENNSYLVANIA.

REAR SWING-TRUCK FOR LOCOMOTIVES.

1,060,499.  Specification of Letters Patent.  Patented Apr. 29, 1913.

Application filed February 17, 1913. Serial No. 748,922.

*To all whom it may concern:*

Be it known that we, KENNETH RUSHTON and ELLWOOD M. SHANNON, citizens of the United States, and residents of Philadelphia, Pennsylvania, have invented certain Improvements in Rear Swing-Trucks for Locomotives, of which the following is a specification.

The object of our invention is to construct the rear swing truck and the equalizing mechanism which extends to the swing truck, so that the said truck and its mechanism will not interfere with the use of a large ash pan.

In this improved truck cross bars are dispensed with, and the construction not only allows for the equipment of the locomotive with a large fire box, but also provides for the free swinging of the truck on its pivot, at the same time holding the equalizing mechanism in proper alinement.

In the accompanying drawings:—Figure 1, is a plan view of the under framing of a locomotive illustrating our invention; Fig. 2, is a side view illustrating a portion of the rear of a locomotive and showing our invention; the axle being in section on the line a—a, Fig. 1; Fig. 3, is a rear view of a locomotive illustrating our improvement; Fig. 4, is a perspective view of the swing bracket illustrated in Fig. 1; and Fig. 5, is a view showing the connecting link between the equalizing bar and the spring.

Referring to the drawings, 1, 1 are the two side frames of the locomotive.

2 is one of the driving axles having wheels.

4 is the boiler and 5 is the fire box having the ash pan 6, which extends both forward and back of the axle 7 of the swing truck 8 and between the side frames 1 of the locomotive. The frame 9 of the swing truck is pivoted at 10 to a cross member 11 extending from one side frame to the other. The frame of the truck is below the side frames and extends out beyond the side frames, as indicated in Fig. 1, and outside the wheels 12 of the truck. Said frame 9 has pedestals 13 for the box 14 in which the axle 7 is mounted. Each pedestal has an extension 15 in which is mounted the spring 16. The central band of the spring is recessed and rocks on a pivot pin projecting from a plate 17 carried by the pedestal, as clearly shown in Fig. 2. The rear end of the spring 16 is connected to a bracket 18 by two links 19. The upper ends of these links are secured to a clip 20 which extends through a slot in the spring, in the present instance, and is held in place by a transverse pin. Each bracket 18 is firmly secured to a side frame 1 of the locomotive. The opposite end of each spring 16 is connected to a diagonal equalizing lever 21 pivoted at 22 through a clip 24, a pair of links 23 and a clip 25 slotted to receive the hooked end 26 of the equalizing lever. The opposite end of the equalizing lever 21 is connected through a link 27 to a cross bar 28, which is either hung to the frame of the locomotive or is connected to the balance of the equalizing mechanism of the locomotive. The equalizing gear is arranged outside of the frames of the locomotive and clear of the ash pan; there being no transverse bars extending from one side of the truck to the other, which would interfere with a large ash pan.

The truck swings freely on its pivot and mechanism must be provided for properly holding the connection between the equalizing lever and the spring, so that the spring will not be drawn out of line and lateral strain placed upon the lever. This is accomplished by a bracket 29, which is pivoted at 30 to bearings secured to each side frame of the locomotive. The brackets are so formed as to extend through the space between the links 23, which connect the spring 15 to the equalizing lever 21. This construction holds the parts in alinement and yet gives the flexibility necessary for the proper working of the truck and the equalizing gear.

On the rear of the locomotive frame is the ordinary centering cylinder 31 and on the truck are the plungers 32, so that when the truck moves out of alinement with the frame of the locomotive it is brought into alinement again by this centering element. This feature, however, forms no part of our invention.

We claim:—

1. The combination in a locomotive, of a frame; a swing truck pivoted to the frame; an equalizing spring mounted on each side of the truck; a link connecting the rear end of each spring with the frame of the locomotive; diagonal equalizing levers mounted on the frame of the locomotive; links connecting the forward ends of the springs to the rear ends of the diagonal equalizing levers; and a pivoted bracket coupling the last mentioned links to the side frames of the locomotive.

2. The combination in a locomotive, of side frames; a pivoted swing truck at the rear of the locomotive, the frame of the truck extending outside of the line of the wheels; an axle mounted on the truck; wheels on the axle located between the frame of the truck and the side frames of the locomotive; an ash pan located between the frames of the locomotive and extending forward of and rear of the axle of the truck; diagonal equalizing levers pivotally mounted on the frame of the locomotive; a spring resting on each side frame of the truck above the axle; a fixed bracket projecting from each side frame of the locomotive at the rear of the truck; links connecting said brackets with the springs; links connecting the forward ends of the springs with the rear ends of the diagonal equalizing levers; and brackets adapted to the side frames of the locomotive in front of the truck and extending through the space between the links connecting the equalizing levers with the spring.

3. The combination in a locomotive, of side frames; a cross member; a truck frame pivoted to the said cross member, the said frame of the truck extending below the frame of the locomotive; a pedestal at each side of the frame; boxes in the pedestal; an axle; wheels mounted on the axle and located between the pedestals and the side frames of the locomotive; a spring pivotally mounted on each pedestal above the axle; a bracket secured to each side of the side frames of the locomotive; links connecting the brackets with the rear ends of the springs; a diagonal equalizing beam pivotally mounted on each frame of the locomotive; a link connecting the rear end of each equalizing beam with the forward end of a spring; and brackets pivotally mounted on the frame of the locomotive at each side and arranged to swing vertically, the said brackets extending between the links connecting the rear ends of the equalizing levers with the springs, so as to hold the parts in alinement when the truck swings on its pivot.

In testimony whereof, we have signed our names to this specification, in the presence of two subscribing witnesses.

KENNETH RUSHTON.
ELLWOOD M. SHANNON.

Witnesses:
CARLETON LINSLEY,
R. H. SANFORD.

Copies of this patent may be obtained for five cents each, by addressing the "Commissioner of Patents, Washington, D. C."